(No Model.)
J. J. MURPHY.
COMPOSITION OF MATTER FOR MAKING AND SEALING JOINTS BETWEEN PIPES, &c.
No. 560,321. Patented May 19, 1896.
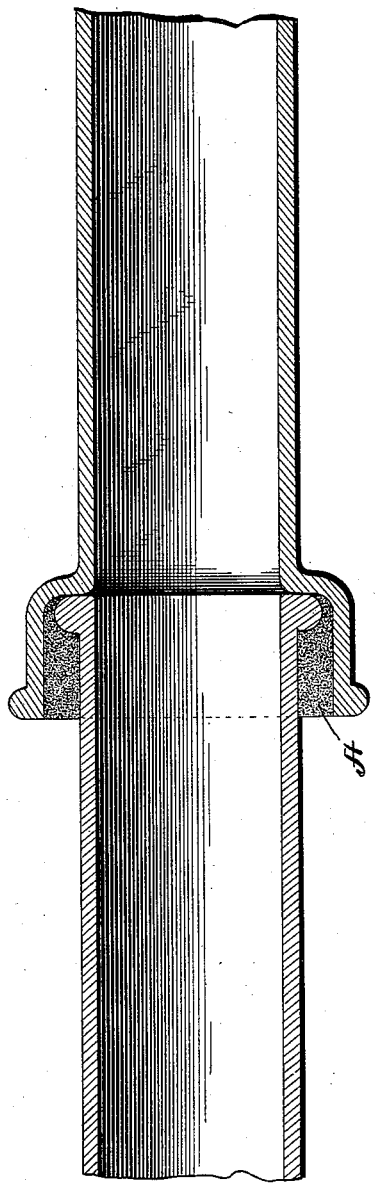
Witnesses
E. C. Wurdeman
S. T. Williamson
Inventor
James J. Murphy
by Geo. H. Holgate
Attorney

UNITED STATES PATENT OFFICE.

JAMES J. MURPHY, OF PHILADELPHIA, PENNSYLVANIA.

COMPOSITION OF MATTER FOR MAKING AND SEALING JOINTS BETWEEN PIPES, &c.

SPECIFICATION forming part of Letters Patent No. 560,321, dated May 19, 1896.

Application filed September 26, 1895. Serial No. 563,733. (No specimens.)

*To all whom it may concern:*

Be it known that I, JAMES J. MURPHY, a citizen of the United States, residing at Philadelphia, in the county of Philadelphia and State of Pennsylvania, have invented certain new and useful Improvements in Composition of Matter for Making and Sealing Joints Between Pipes and the Like, of which the following is a specification.

My composition consists of the following ingredients combined in the proportions stated, namely: flower of sulfur, one hundred pounds; fine flint sand, one hundred pounds; antimony, two pounds; lead, nine pounds; bismuth, one pound; powdered glass, ten pounds; borax, two pounds.

The above ingredients are finely powdered and thoroughly mixed by mechanical means, so as to be homogeneous, and in using the composition it is placed in a ladle or other convenient device and subjected to sufficient heat to fuse the sulfur, antimony, lead, bismuth, and borax, leaving the sand and glass in suspension to serve as a base or body around which the other ingredients, in passing from a liquid to a solid state, may form. The male and female ends of two pipes are brought together in their proper relative position, as shown in the drawing, and this liquid mass poured into the space between the male and female ends of the pipes and permitted to cool and "set" before subjecting the joint to strain.

By the use of the above composition and the method of applying the same the ingredients in passing from a liquid state to a solid state expand to such a degree as to firmly unite the joint and prevent any liability of its being fractured by any strain or test which the pipe itself is capable of withstanding.

One of the properties of this new compound is that it not only expands in cooling, but firmly unites itself to the surfaces of the pipes forming the joint, and in practice it has been demonstrated that a joint thus formed with this compound is stronger by many degrees than the pipe itself, and does not deteriorate from atmospheric action nor from the chemical actions which take place when buried in the ground.

In order to enable the joint to withstand lengthwise strain, the female end of the pipe may be reduced in diameter at its mouth, thus forming a wedge of the compound A when set therein.

What I claim as new and useful is—

The herein-described composition of matter for forming joints, consisting of flower of sulfur, fine flint sand, antimony, lead, bismuth, powdered glass and borax, in the proportions specified.

In testimony whereof I have hereunto affixed my signature in the presence of two subscribing witnesses.

JAMES J. MURPHY.

Witnesses:
ALLISON W. MCCURDY,
S. S. WILLIAMSON.